(12) United States Patent
Aoyagi et al.

(10) Patent No.: US 11,990,619 B2
(45) Date of Patent: May 21, 2024

(54) COATED CATHODE ACTIVE MATERIAL, METHOD FOR PRODUCING COATED CATHODE ACTIVE MATERIAL, AND ALL SOLID STATE BATTERY

(71) Applicant: TOYOTA JIDOSHA KABUSHIKI KAISHA, Toyota (JP)

(72) Inventors: Koutarou Aoyagi, Toyota (JP); Takuya Matsuyama, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 13 days.

(21) Appl. No.: 17/538,705

(22) Filed: Nov. 30, 2021

(65) Prior Publication Data

US 2022/0173393 A1 Jun. 2, 2022

(30) Foreign Application Priority Data

Dec. 1, 2020 (JP) ................................. 2020-199476

(51) Int. Cl.
*H01M 4/04* (2006.01)
*H01M 4/131* (2010.01)
(Continued)

(52) U.S. Cl.
CPC ........... *H01M 4/58* (2013.01); *H01M 4/0407* (2013.01); *H01M 4/0426* (2013.01);
(Continued)

(58) Field of Classification Search
CPC .. H01M 4/0426; H01M 4/1391; H01M 4/366; H01M 4/628; H01M 4/62; H01M 4/58; H01M 4/0407; H01M 4/131; H01M 4/505; H01M 4/525; H01M 4/50; H01M 4/52; H01M 2300/0068
See application file for complete search history.

(56) References Cited

U.S. PATENT DOCUMENTS

| | | | |
|---|---|---|---|
| 6,077,625 | A | 6/2000 | Yano et al. |
| 2010/0216030 | A1 | 8/2010 | Maeda |

(Continued)

FOREIGN PATENT DOCUMENTS

| | | |
|---|---|---|
| CN | 105470475 A | 4/2016 |
| CN | 111987313 A | 11/2020 |

(Continued)

OTHER PUBLICATIONS

Wang et al.; "Lithium Ion Conduction in Cathode Coating Materials from On-the-Fly Machine Learning;" Chemistry of Materials; 2020; pp. 3741-3752; vol. 32.

(Continued)

*Primary Examiner* — Eugenia Wang
(74) *Attorney, Agent, or Firm* — Oliff PLC

(57) ABSTRACT

A main object of the present disclosure is to provide a cathode active material capable of suppressing the reaction with a solid electrolyte. The present disclosure achieves the object by providing a coated cathode active material comprising: a cathode active material, and a coating portion coating at least a part of a surface of the cathode active material, and the coating portion includes a scandium lithium phosphate based compound or a lithium borate based compound.

4 Claims, 5 Drawing Sheets

(51) Int. Cl.
  *H01M 4/1391* (2010.01)
  *H01M 4/36* (2006.01)
  *H01M 4/505* (2010.01)
  *H01M 4/525* (2010.01)
  *H01M 4/58* (2010.01)
  *H01M 4/62* (2006.01)
  *H01M 10/0525* (2010.01)
  *H01M 10/0562* (2010.01)

(52) U.S. Cl.
  CPC ......... *H01M 4/131* (2013.01); *H01M 4/1391* (2013.01); *H01M 4/366* (2013.01); *H01M 4/505* (2013.01); *H01M 4/525* (2013.01); *H01M 4/628* (2013.01); *H01M 10/0525* (2013.01); *H01M 10/0562* (2013.01); *H01M 2300/0068* (2013.01)

(56) References Cited

U.S. PATENT DOCUMENTS

| | | | |
|---|---|---|---|
| 2015/0093651 A1* | 4/2015 | Aihara | H01M 10/052 429/304 |
| 2016/0043395 A1 | 2/2016 | Kawakami et al. | |
| 2016/0268586 A1* | 9/2016 | Kawakami | H01M 4/62 |
| 2017/0317342 A1 | 11/2017 | Kang et al. | |
| 2018/0183053 A1* | 6/2018 | Hori | H01M 4/13915 |
| 2018/0375151 A1* | 12/2018 | Gaben | H01M 4/0457 |
| 2019/0140265 A1 | 5/2019 | Miara et al. | |
| 2020/0168903 A1 | 5/2020 | Ju | |
| 2020/0243859 A1* | 7/2020 | Rempel | H01M 4/525 |
| 2020/0388839 A1 | 12/2020 | Min et al. | |
| 2022/0255119 A1* | 8/2022 | Kuwata | H01M 10/0562 |

FOREIGN PATENT DOCUMENTS

| | | |
|---|---|---|
| EP | 3 093 913 A2 | 11/2016 |
| JP | H11-007950 A | 1/1999 |
| JP | 2002-298840 A | 10/2002 |
| JP | 2010-192373 A | 9/2010 |
| JP | 2011-086555 A | 4/2011 |
| JP | 2012-089406 A | 5/2012 |
| JP | 2020-525991 A | 8/2020 |
| WO | 2019/132381 A1 | 7/2019 |

OTHER PUBLICATIONS

Aoyagi et al.; "Computational Design of Cathode Coating Materials for All-Solid-State Lithium-Ion Batteries;" SAE Technical Paper; 2021.

\* cited by examiner

Example 1-1

Example 1-2

Example 1-3

Example 2-1

Example 2-2

Example 2-3

Comp. Ex. 1-1

Comp. Ex. 1-2

Comp. Ex. 1-3

COATED CATHODE ACTIVE MATERIAL, METHOD FOR PRODUCING COATED CATHODE ACTIVE MATERIAL, AND ALL SOLID STATE BATTERY

TECHNICAL FIELD

The present disclosure relates to a coated cathode active material, a method for producing a coated cathode active material, and an all solid state battery.

BACKGROUND ART

An all solid state battery is a battery including a solid electrolyte layer between a cathode active material layer and an anode active material layer, and has advantages in that it is easy to simplify a safety device as compared with a liquid battery including a liquid electrolyte containing flammable organic solvents.

An attempt to suppress the reaction between a cathode active material and a solid electrolyte has been known. For example, Patent Literature 1 discloses a non-aqueous electrolyte battery comprising an intermediate layer formed between a cathode layer and a solid electrolyte layer, wherein the intermediate layer includes a Li ion conductive oxide ($LiNbO_{3-\alpha}$) with an oxygen deficiency.

Also, Patent Literature 2 discloses a cathode for an all solid state secondary battery, the cathode includes a surface treated cathode active material, wherein at least of a part of the surface of the cathode active material is coated with an oxide including at least one kind of an element belonging to group 13 in the periodic table.

Also, Patent Literature 3 discloses a cathode active material for an alkaline battery wherein 1% to 30% of the surface area of a solid solution particle including a nickel hydroxide as a main component; the cathode active material is coated with at least one kind of oxide particle selected from yttrium, scandium, and lanthanoid; and the outer periphery thereof is coated with a cobalt oxide with a cobalt average valence number of more than 3.0 valent.

Patent Literature 4 discloses a non-sintered type nickel electrode for an alkaline battery comprising an inner coating layer including a cobalt or a cobalt compound coating a base particle, and an outer coating layer including yttrium, scandium, lanthanoid, or a compound thereof coating the inner coating layer.

CITATION LIST

Patent Literatures

Patent Literature 1: Japanese Patent Application Laid-Open (JP-A) No. 2011-086555
Patent Literature 2: JP-A No. 2010-192373
Patent Literature 3: JP-A No. 2002-298840
Patent Literature 4: JP-A No. H11-007950

SUMMARY OF DISCLOSURE

Technical Problem

If a cathode active material and a solid electrolyte are reacted, a high resistance layer is generated at the interface of the two, so that the internal resistance of an all solid state battery is increased.

The present disclosure has been made in view of the above circumstances, and a main object thereof is to provide a cathode active material capable of suppressing the reaction with a solid electrolyte.

Solution to Problem

The present disclosure provides a coated cathode active material comprising: a cathode active material, and a coating portion coating at least a part of a surface of the cathode active material, and the coating portion includes a scandium lithium phosphate based compound or a lithium borate based compound.

According to the present disclosure, by providing the coating portion including a scandium lithium phosphate based compound or a lithium borate based compound on the surface of the cathode active material, a coated cathode active material capable of suppressing the reaction with a solid electrolyte, may be obtained.

In the disclosure, a molar ratio of the Li, the Sc, and the P in the scandium lithium phosphate based compound my satisfy Li:Sc:P=3.00:2.19 to 5.00:1.99 to 2.57.

In the disclosure, in the scandium lithium phosphate based compound, a molar ratio (Li/Sc) of Li to Sc may be 0.60 or more.

In the disclosure, a molar ratio of Li and B in the lithium borate based compound may satisfy Li:B=3.00:5.04 to 6.72.

In the disclosure, in the lithium borate based compound, a molar ratio (Li/B) of Li to B may be 0.60 or less.

The present disclosure also provides a method for producing a coated cathode active material, the coated cathode active material including a cathode active material, and a coating portion coating at least a part of a surface of the cathode active material, the method comprising: a preparing step of preparing the cathode active material, and a coating portion forming step of forming the coating portion on the surface of the cathode active material by a sputtering method using a scandium lithium phosphate based precursor compound or a lithium borate based precursor compound, as a target.

According to the present disclosure, by carrying out a sputtering method using a scandium lithium phosphate based precursor compound or a lithium borate based precursor compound, as a target, a coated cathode active material capable of suppressing the reaction with a solid electrolyte, may be obtained.

In the disclosure, the scandium lithium phosphate based precursor compound may be $Li_3Sc_2(PO_4)_3$.

In the disclosure, the lithium borate based precursor compound may be $Li_3B_7O_{12}$.

The present disclosure also provides an all solid state battery comprising a cathode active material layer, an anode active material layer, and a solid electrolyte layer formed between the cathode active material layer and the anode active material layer, and the cathode active material layer includes the coated cathode active material described above.

According to the present disclosure, since the cathode active material layer includes the above described coated cathode active material, an all solid state battery wherein the reaction between the coated cathode active material and the solid electrolyte is suppressed, may be obtained.

In the disclosure, the cathode active material in the coated cathode active material may be an oxide active material, and the cathode active material layer may include a sulfide solid electrolyte.

Advantageous Effects of Disclosure

The present disclosure exhibits an effect that a cathode active material capable of suppressing the reaction with a solid electrolyte, may be provided.

DESCRIPTION OF EMBODIMENTS

A. Coated Cathode Active Material

Figure 1:
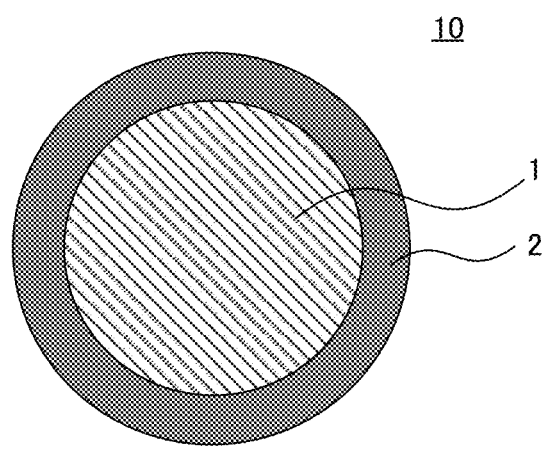
FIG. 1 is a schematic cross-sectional view illustrating an example of a coated cathode active material in the present disclosure.

A coated cathode active material in the present disclosure will be hereinafter described in detail. FIG. 1 is a schematic cross-sectional view illustrating an example of a coated cathode active material in the present disclosure. Coated cathode active material 10 shown in FIG. 1 comprises cathode active material 1, and coating portion 2 coating at least a part of the surface of cathode active material 1, and coating portion 2 includes a scandium lithium phosphate based compound or a lithium borate based compound.

According to the present disclosure, by providing the coating portion including a scandium lithium phosphate based compound or a lithium borate based compound on the surface of the cathode active material, a coated cathode active material capable of suppressing the reaction with a solid electrolyte, may be obtained. Specifically, similarly to the conventional lithium niobate ($LiNbO_3$), the scandium lithium phosphate based compound or the lithium borate based compound is able to suppress the reaction between the cathode active material and the solid electrolyte. Also, the oxidation potential of the scandium lithium phosphate based compound or the lithium borate based compound is higher than that of the conventional lithium niobate ($LiNbO_3$). Since the oxidation potential is high, the coating portion may be suppressed from being reacted with the solid electrolyte during charge. As the result, the coating portion and the solid electrolyte may be suppressed from being deteriorated. Also, since the oxidation potential is high, the oxidation decomposition of the scandium lithium phosphate based compound or the lithium borate based compound during charge may be suppressed. As the results of the above, the increase of the internal resistance over time is less likely to occur so that the cycle property may be improved.

1. Coating Portion

The coating portion in the present disclosure is formed so as to coat at least a part of the surface of the cathode active material. Also, the coating portion includes a scandium lithium phosphate based compound or a lithium borate based compound.

The scandium lithium phosphate based compound usually includes Li, Sc, and $PO_4$. Also, the molar ratio of Li, Sc, and P in the scandium lithium phosphate based compound is not particularly limited, and preferably satisfies, for example, Li:Sc:P=3.00:2.19 to 5.00:1.99 to 2.57. Also, the scandium lithium phosphate based compound preferably includes a composition represented by, for example, $Li_xSc_y(PO_4)_z$. The "x", "y", and "z" preferably satisfy x:y:z=3.00:2.19 to 5.00:1.99 to 2.57.

Also, in the scandium lithium phosphate based compound, the molar ratio of Li to Sc is regarded as Li/Sc, the molar ratio of Li to P is regarded as Li/P, and the molar ratio of Sc to P is regarded as Sc/P. Li/Sc is, for example, 0.60 or more, may be 0.63 or more, and may be 0.80 or more. Meanwhile, Li/Sc is, for example, 1.37 or less. Li/P is, for example, 1.50 or less, and may be 1.40 or less. Meanwhile, Li/P is, for example, 1.17 or more. Sc/P is, for example, 2.51 or less, may be 2.38 or less, and may be 2.00 or less. Meanwhile, Sc/P is, for example, 0.85 or more.

The lithium borate based compound usually includes Li, B, and O. Also, the molar ratio of Li and B in the lithium borate based compound is not particularly limited, and preferably satisfies, for example, Li:B=3.00:5.04 to 6.72. Also, the lithium borate based compound preferably includes a composition represented by, for example, $Li_aB_bO_c$. The "a", "b", and "c" preferably satisfy a:b:c=3.00:5.04 to 6.72:9.06 to 12.0.

Also, in the lithium borate based compound, the molar ratio of Li to B is regarded as Li/B. Li/B is, for example, 0.60 or less, may be 0.58 or less, and may be 0.50 or less. Meanwhile, Li/B is, for example, 0.45 or more.

The coating portion preferably includes the scandium lithium phosphate based compound or the lithium borate based compound as a main component. The proportion of the scandium lithium phosphate based compound or the lithium borate based compound in the coating portion is, for example, 50 weight % or more, may be 70 weight % or more, and may be 90 weight % or more. Also, the coating portion may include only the scandium lithium phosphate based compound, and may include only the lithium borate based compound. Also, the coating portion includes at least the scandium lithium phosphate based compound or the lithium borate based compound, and may include both of the scandium lithium phosphate based compound and the lithium borate based compound.

The thickness of the coating portion is, for example, 5 nm or more, and may be 10 nm or more. Meanwhile, the thickness of the coating portion is, for example, 100 nm or less, may be 50 nm or less, and may be 20 nm or less. When the coating portion is too thin, there is a possibility that the effects in the present disclosure cannot be obtained, and when the coating portion is too thick, there is a possibility that the inner resistance of an all solid state battery is increased. The thickness of the coating portion may be measured by, for example, using a transmission electron microscope (TEM).

The coating portion coats at least a part of the surface of the cathode active material. The coating portion may be formed on a part of the surface of the cathode active material, and may be formed on the entire surface. The coverage of the coating portion is, for example, 50% or more, and may be 70% or more, and may be 90% or more. Meanwhile, the coverage of the coating portion may be 100%, and may be less than 100%. The coverage may be determined by X-ray photoelectron spectroscopy (XPS) measurement. Incidentally, the cathode active material and the coating portion may be in direct contact, and may be placed via another layer.

Since the method for forming a coating portion will be described in detail in "B. Method for producing a coated cathode active material" later, the description herein is omitted.

2. Cathode Active Material

Examples of the cathode active material may include an oxide active material. Specifically, examples of the oxide active material may include rock salt bed type active materials such as $LiCoO_2$, $LiMnO_2$, $LiNiO_2$, $LiVO_2$, $LiNi_{1/3}Co_{1/3}Mn_{1/3}O_2$; spinel type active materials such as $LiMn_2O_4$, and $LiNi_{0.5}Mn_{1.5}O_4$; and olivine type active materials such as $LiFePO_4$, $LiMnPO_4$, $LiNiPO_4$, and $LiCuPO_4$. Particularly, when the cathode active material is an oxide active material, and the cathode active material layer includes a sulfide solid electrolyte, a high resistance layer is likely to be formed at the interface of the oxide active material and the sulfide solid electrolyte. Although in such a case, the reaction between the oxide active material and the sulfide solid electrolyte may be suppressed by providing the coating portion described above.

Examples of the shape of the cathode active material may include a granular shape. The average particle size ($D_{50}$) of the cathode active material is not particularly limited; and is, for example, 10 nm or more, and may be 100 nm or more. Meanwhile, the average particle size ($D_{50}$) of the cathode active material is, for example, 50 µm or less, and may be 20 µm or less. Incidentally, the average particle size ($D_{50}$) may be calculated from the measurement by, for example, a laser diffraction particle size analyzer, and a scanning electron microscope (SEM).

3. Coated Cathode Active Material

The coated cathode active material in the present disclosure is usually used for an all solid state battery. Since the all solid state battery will be described in detail in "C. All solid state battery" later, the description herein is omitted.

B. Method for Producing Coated Cathode Active Material

The method for producing a coated cathode active material in the present disclosure is a method for producing a coated cathode active material including a cathode active material, and a coating portion coating at least a part of a surface of the cathode active material, the method comprising: a preparing step of preparing the cathode active material, and a coating portion forming step of forming the coating portion on the surface of the cathode active material by a sputtering method using a scandium lithium phosphate based precursor compound or a lithium borate based precursor compound, as a target.

According to the present disclosure, by carrying out a sputtering method using a scandium lithium phosphate based precursor compound or a lithium borate based precursor compound, as a target, a coated cathode active material capable of suppressing the reaction with a solid electrolyte, may be obtained.

The preparing step in the present disclosure is a step of preparing the cathode active material. The cathode active material may be prepared by synthesizing by oneself, and may be prepared by purchasing as a commercially available product. Since the cathode active material is similar to those described in "A. Coated cathode active material" above, the description herein is omitted.

The coating portion forming step in the present disclosure is a step of forming the coating portion on the surface of the cathode active material by a sputtering method using a scandium lithium phosphate based precursor compound or a lithium borate based precursor compound, as a target.

The scandium lithium phosphate based precursor compound usually includes Li, Sc, ad $PO_4$. Examples of the scandium lithium phosphate based precursor compound may include $Li_3Sc_2(PO_4)_3$. Meanwhile, the lithium borate based precursor compound includes Li, B, and O. Examples of the lithium borate based precursor compound may include $Li_3B_7O_{12}$. As the sputtering, for example, a barrel sputtering is preferable. The reason therefor is to form a film uniformly on the surface of the cathode active material. The thickness of the coating portion may be adjusted by adjusting, for example, sputtering time.

In the coating portion forming step, a heat treatment may or may not be carried out after the sputtering described above, and the latter is preferable. The reason therefor is to further suppress the reaction with the solid electrolyte. Meanwhile, in the former case, the heat treatment temperature is, for example, 300° C. or more, and may be 400° C. or more. Examples of the heat treatment atmosphere may include an argon atmosphere. Also, the heat treatment time is, for example, one hour or more and 10 hours or less, and preferably approximately 5 hours.

C. All Solid State Battery

Figure 2:
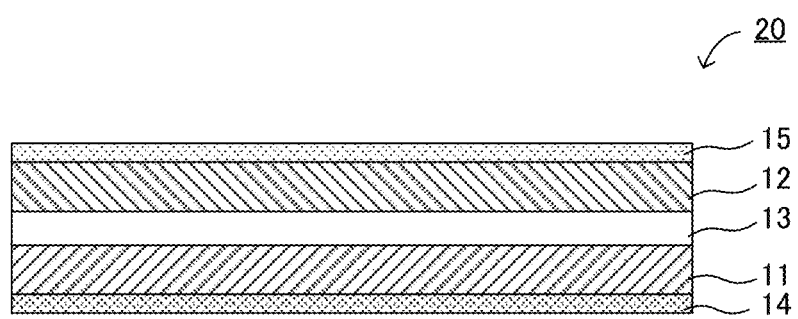
FIG. 2 is a schematic cross-sectional view illustrating an example of an all solid state battery in the present disclosure.

FIG. 2 is a schematic cross-sectional view of an all solid state battery in the present disclosure. All solid state battery 20 shown in FIG. 2 comprises cathode active material layer 11 including the coated cathode active material described above, anode active material layer 12, solid electrolyte layer 13 formed between cathode active material layer 11 and anode active material layer 12, cathode current collector 14 configured to collect currents of cathode active material layer 11, and anode current collector 15 configured to collect currents of anode active material layer 12.

According to the present disclosure, since the cathode active material layer includes the above described coated cathode active material, an all solid state battery wherein the reaction between the coated cathode active material and the solid electrolyte is suppressed, may be obtained.

1. Cathode Active Material Layer

The cathode active material layer is a layer including at least the coated cathode active material described above, and may include at least one of a solid electrolyte, a conductive material, and a binder, as necessary. The content of the coated cathode active material in the cathode active material layer is not particularly limited, and may be appropriately determined according to an object battery performance. The proportion of the coated cathode active material in the cathode active material layer is, for example, 20 weight % or more, may be 30 weight % or more, and may be 40 weight % or more. Meanwhile, the proportion of the coated cathode active material is, for example, 80 weight % or less, may be 70 weight % or less, and may be 60 weight % or less.

The cathode active material layer preferably includes a solid electrolyte. A conventionally known solid electrolyte usually used for an all solid state lithium ion battery may be used as the solid electrolyte, and examples thereof may include a sulfide solid electrolyte, an oxide solid electrolyte, a nitride solid electrolyte, and a halide solid electrolyte. Among the above, the sulfide solid electrolyte is preferable. Particularly, in the cathode active material layer, the sulfide solid electrolyte is preferably in contact with the coated cathode active material. The reason therefor is to further achieve the effects in the present disclosure.

Examples of the sulfide solid electrolyte may include a solid electrolyte containing a Li element, an X element (X is at least one kind of P, As, Sb, Si, Ge, Sn, B, Al, Ga, and In), and a S element. Also, the sulfide solid electrolyte may further include at least one of an O element and a halogen element. Examples of the halogen element may include a F element, a Cl element, a Br element, and an I element.

It is preferable that the sulfide solid electrolyte includes an anion structure of an ortho composition ($PS_4^{3-}$ structure, $SiS_4^{4-}$ structure, $GeS_4^{4-}$ structure, $AlS_3^{3-}$ structure, and $BS_3^{3-}$ structure) as the main component of the anion. The reason therefor is to allow a high chemical stability. The proportion of the anion structure of an ortho composition to all the anion structures in the sulfide solid electrolyte is, for example, 70 mol % or more, and may be 90 mol % or more. The proportion of the anion structure of an ortho composition may be determined by, for example, a Raman spectroscopy, NMR, and XPS. Specific examples of the sulfide solid electrolyte may include $xLi_2S \cdot (100-x)P_2S_5$ ($70 \leq x \leq 80$), and $yLiI \cdot zLiBr \cdot (100-y-z)Li_3PS_4$ ($0 \leq y \leq 30$, and $0 \leq z \leq 30$).

The sulfide solid electrolyte may be a glass based sulfide solid electrolyte, and may be a glass ceramic based sulfide solid electrolyte. The glass based sulfide solid electrolyte may be obtained by vitrifying raw material. The glass ceramic based sulfide solid electrolyte may be obtained by, for example, heat treating the above described glass based sulfide solid electrolyte. Also, the sulfide solid electrolyte preferably includes a predetermined crystal structure. Examples of the crystal structure may include a Thio-LISICON type crystal structure, a LGPS type crystal structure, and an argyrodite type crystal structure.

Examples of the shape of the solid electrolyte may include a granular shape. The average particle size of the solid electrolyte is, for example, 0.05 μm or more, and may be 0.1 μm or more. Meanwhile, the average particle size of the solid electrolyte is, for example, 50 μm or less, and may be 20 μm or less. The average particle size of the solid electrolyte may be defined as $D_{50}$, and may be calculated from the measurement by, for example, a laser diffraction particle size analyzer, and a scanning electron microscope (SEM).

The cathode active material layer may include a conductive material. The electron conductivity in the cathode active material layer may be improved by using the conductive material. Examples of the conductive material may include a carbon material, a metal particle, and a conductive polymer. Examples of the carbon material may include a granular carbon materials such as acetylene black (AB) and Ketjen black (KB); and a fibrous carbon materials such as carbon fiber, carbon nanotube (CNT), and carbon nanofiber (CNF).

Also, the cathode active material layer may include a binder. The denseness of the cathode active material layer may be improved by using the binder. Examples of the binder may include rubber based binders such as butylene rubber (BR) and styrene butadiene rubber (SBR); and fluoride based binders such as polyvinylidene fluoride (PVDF) and polytetrafluoroethylene (PTFE). The thickness of the cathode active material layer is, for example, 0.1 μm or more and 1000 μm or less. Examples of the method for forming the cathode active material layer may include a method wherein a mixture including at least the coated cathode active material and a dispersing medium is pasted and dried.

2. Anode Active Material Layer

The anode active material layer is a layer including at least an anode active material. Also, the anode active material layer may include at least one of a solid electrolyte, a conductive material, and a binder, as necessary.

The anode active material is not particularly limited, and examples thereof may include a metal active material, a carbon active material, and an oxide active material. Examples of the metal active material may include a simple substance of a metal, and a metal alloy. Examples of the metal element included in the metal active material may include Si, Sn, In, and Al. The metal alloy is preferably an alloy including the above described metal element as a main component.

Meanwhile, examples of the carbon active material may include mesocarbon microbeads (MCMB), highly oriented pyrolytic graphite (HOPG), hard carbon, and soft carbon. Also, examples of the oxide active material may include lithium titanate such as $Li_4Ti_5O_{12}$.

The proportion of the anode active material in the anode active material layer is, for example, 20 weight % or more, may be 30 weight % or more, and may be 40 weight % or more. Meanwhile, the proportion of the anode active material is, for example, 80 weight % or less, may be 70 weight % or less, and may be 60 weight % or less.

The solid electrolyte, the conductive material and the binder may be similar to those described in "1. Cathode active material layer" above; thus, the descriptions herein are omitted. The thickness of the anode active material layer is, for example, 0.1 μm or more and 1000 μm or less.

3. Solid Electrolyte Layer

The solid electrolyte layer is a layer formed between the cathode active material layer and the anode active material layer, and is a layer including at least a solid electrolyte. Also, the solid electrolyte layer may include the solid electrolyte only, and may further include a binder.

The solid electrolyte layer preferably includes a sulfide solid electrolyte as the solid electrolyte. Particularly, the sulfide solid electrolyte included in the solid electrolyte layer is preferably in contact with the coated cathode active material included in the cathode active material layer. The sulfide solid electrolyte, and the binder may be similar to those described in "1. Cathode active material layer" above; thus, the descriptions herein are omitted. The thickness of the solid electrolyte layer is, for example, 0.1 μm or more and 1000 μm or less.

4. Other Constitutions

The all solid state battery in the present disclosure preferably comprises a cathode current collector configured to collect currents of the cathode active material layer and an anode current collector configured to collect currents of the anode active material layer. Examples of the materials for the cathode current collector may include SUS, aluminum, nickel, iron, titanium, and carbon. Meanwhile, examples of the materials for the anode current collector may include SUS, copper, nickel, and carbon.

The kind of the all solid state battery in the present disclosure is not particularly limited; and is typically a lithium ion battery. Also, the all solid state battery in the present disclosure may be a primary battery and may be a secondary battery; above all, preferably the secondary battery so as to be repeatedly charged and discharged, and be useful as a car-mounted battery, for example.

The all solid state battery in the present disclosure may be a single cell battery and may be a stacked battery. The stacked battery may be a monopolar type stacked battery (a stacked battery connected in parallel), and may be a bipolar type stacked battery (a stacked battery connected in series). Examples of the shape of the battery may include a coin shape, a laminate shape, a cylindrical shape, and a square shape.

The present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

An all solid state battery in the present disclosure will be hereinafter described in further detail referring to Examples and Comparative Examples.

Example 1-1

Production of Cathode Active Material Layer

A coating was carried out to 10 g of NCM (LiNi$_{1/3}$Co$_{1/3}$Mn$_{1/3}$O$_2$, cathode active material) by a barrel sputtering using Li$_3$Sc$_2$(PO$_4$)$_3$ as a target. Thereby a coated cathode active material including a coating portion of 10 nm thickness was obtained.

A PVDF, the coated cathode active material obtained above, a solid electrolyte (Li$_2$S—P$_2$S$_5$ based glass ceramic), and a conductive material (vapor grown carbon fiber, VGCF, from Showa Denko Co., Ltd.) were added to a polypropylene (PP) container, and the PP container was stirred for 30 seconds with an ultrasonic dispersion apparatus (UH-50, from SMT Corp.). Next, the PP container was shaken with a shaker (TTM-1, from Sibata Scientific Technology LTD.) for 3 minutes, further, stirred for 30 seconds with the ultrasonic dispersion apparatus to obtain a coating solution. An Al foil (from Nippon Foil Mfg. Co., Ltd.) substrate was coated with the obtained coating solution by a blade method using an applicator. After naturally drying, the coating layer was dried for 30 minutes on a hot plate adjusted to be 100° C., thereby forming a cathode active material layer on one surface of the Al foil substrate.

Production of Cathode Current Collector

A carbon black, and a PVDF based binder (from Kureha Co., Ltd.) were weighed so as the weight % was 30:70, and an organic solvent was added thereto, to obtain a coating solution. An Al foil (15 μm thickness) was coated with the obtained coating solution by a blade method using an applicator. After naturally drying, the coating layer was dried for 30 minutes on a hot plate adjusted to be 100° C. Thereby, a cathode current collector including a carbon layer of 2 μm thickness on one surface of the Al foil was formed.

Production of Anode

A PVDF based binder (from Kureha Co., Ltd.), an anode active material (a lithium titanate (LTO)), and the solid electrolyte described above were added to a PP container, and the PP container was stirred for 30 seconds with an ultrasonic dispersion apparatus (UH-50, from SMT Corp.), to obtain a coating solution. Next, a Cu foil (anode current collector) was prepared, and it was coated with the obtained coating solution by a blade method using an applicator. After naturally drying the coated electrode, it was dried for 30 minutes on a hot plate adjusted to be 100° C. Thereby, an anode active material layer was formed on one surface of the Cu foil (anode current collector). Then, by a similar treatment, an anode was obtained by forming an anode active material layer on another surface of the Cu foil (anode current collector).

Production of Solid Electrolyte Layer

A butyl butyrate, and the solid electrolyte described above were added to a PP container, and the PP container was stirred for 30 seconds with an ultrasonic dispersion apparatus (UH-50, from SMT Corp.). Next, the PP container was shaken with a shaker (TTM-1, from Sibata Scientific Technology LTD.) for 30 minutes, further, stirred for 30 seconds with the ultrasonic dispersion apparatus, to obtain a coating solution. An Al foil (from Nippon Foil Mfg. Co., Ltd.) substrate was coated with the obtained coating solution by a blade method using an applicator. After naturally drying, the coating layer was dried for 30 minutes on a hot plate adjusted to be 100° C., thereby obtaining a transfer member including an Al foil and a solid electrolyte layer.

The obtained two transfer members were respectively placed on the anode active material layers formed on both sides of the anode current collector, pressed, and the Al foil substrates of the transfer members were peeled off. Thereby, the solid electrolyte layers were formed on the anode active material layer. The obtained stacked body was punched out so as the size thereof was larger than the cathode current collector obtained above. Then, the two cathode active material layers obtained above were respectively placed on the solid electrolyte layers formed on both sides of the anode, and the stacked body was pressed. Then, the Al foil substrates, on which the cathode active material layers were formed, were peeled off from the cathode active material layers, and the stacked body was pressed. Thereby, an electrode stacked body including an anode active material layer, a solid electrolyte layer, and a cathode active material layer on both sides of the anode current collector was obtained.

Then, using a binder, a cathode current collector was pasted on both sides of the obtained electrode stacked body. Thereby, an all solid state battery including a two-stacked cell structure, wherein a cathode current collector was formed on both sides of the electrode stacked body, was obtained. In this case, the carbon layer side of the cathode current collector was placed so as to be in contact with the cathode active material layer of the electrode stacked body. Further, an evaluation battery was obtained by stacking a plurality of the obtained two-stacked cell structure, welding the terminals, and then, sealing with a laminate file.

Example 1-2

A coated cathode active material was obtained in the same manner as in Example 1-1 except that, after coating by a barrel sputtering, a heat treatment was carried out under the conditions of 300° C. for 5 hours in an Ar atmosphere. An evaluation battery was obtained in the same manner as in Example 1-1 except that the obtained coated cathode active material was used.

Example 1-3

A coated cathode active material was obtained in the same manner as in Example 1-1 except that, after coating by a barrel sputtering, a heat treatment was carried out under the conditions of 400° C. for 5 hours in an Ar atmosphere. An evaluation battery was obtained in the same manner as in Example 1-1 except that the obtained coated cathode active material was used.

Example 2-1

A coated cathode active material was obtained in the same manner as in Example 1-1 except that $Li_3B_7O_{12}$ was used as a target. An evaluation battery was obtained in the same manner as in Example 1-1 except that the obtained coated cathode active material was used.

Example 2-2

A coated cathode active material was obtained in the same manner as in Example 2-1 except that, after coating by a barrel sputtering, a heat treatment was carried out under the conditions of 300° C. for 5 hours in an Ar atmosphere. An evaluation battery was obtained in the same manner as in Example 2-1 except that the obtained coated cathode active material was used.

Example 2-3

A coated cathode active material was obtained in the same manner as in Example 2-1 except that, after coating by a barrel sputtering, a heat treatment was carried out under the conditions of 400° C. for 5 hours in an Ar atmosphere. An evaluation battery was obtained in the same manner as in Example 2-1 except that the obtained coated cathode active material was used.

Comparative Example 1-1

A coated cathode active material was obtained in the same manner as in Example 1-1 except that $LiNbO_3$ was used as a target. An evaluation battery was obtained in the same manner as in Example 1-1 except that the obtained coated cathode active material was used.

Comparative Example 1-2

A coated cathode active material was obtained in the same manner as in Comparative Example 1-1 except that, after coating by a barrel sputtering, a heat treatment was carried out under the conditions of 300° C. for 5 hours in an Ar atmosphere. An evaluation battery was obtained in the same manner as in Comparative Example 1-1 except that the obtained coated cathode active material was used.

Comparative Example 1-3

A coated cathode active material was obtained in the same manner as in Comparative Example 1-1 except that, after coating by a barrel sputtering, a heat treatment was carried out under the conditions of 400° C. for 5 hours in an Ar atmosphere. An evaluation battery was obtained in the same manner as in Comparative Example 1-1 except that the obtained coated cathode active material was used.

Composition Analysis

In order to determine the composition of the coating portion of the coated cathode active material produced in Example 1-1, Example 2-1, and Comparative Example 1-1, a film was formed, taking 24 hours long, on an Al foil using $Li_3Sc_2(PO_4)_3$, $Li_3B_7O_{12}$, and $LiNbO_3$ respectively as a sputtering target. Then, the composition of the coating portion was determined using ICP measurement.

In order to determine the composition of the coating portion of the coated cathode active material formed in Example 1-2, and Example 2-2, a film was formed, taking 24 hours long, on an Al foil using $Li_3Sc_2(PO_4)_3$, and $Li_3B_7O_{12}$ respectively as a sputtering target. Then, a heat treatment was carried out at 300° C. for 5 hours in an Ar atmosphere, and the composition of the coating portion was determined using ICP measurement.

In order to determine the composition of the coating portion of the coated cathode active material formed in Example 1-3, and Example 2-3, a film was formed, taking 24 hours long, on an Al foil using $Li_3Sc_2(PO_4)_3$, and $Li_3B_7O_{12}$ respectively as a sputtering target. Then, a heat treatment was carried out at 400° C. for 5 hours in an Ar atmosphere, and, the composition of the coating portion was determined using ICP measurement.

The results of the composition analysis in Examples 1-1 to 1-3, and Examples 2-1 to 2-3 are shown in Table 1 and Table 2. Incidentally, the results of the composition analysis in Comparative Example 1-1 was Li:Nb=1:0.99.

TABLE 1

|  | Li | Sc | P |
| --- | --- | --- | --- |
| Example 1-1 | 3.00 | 2.19 | 2.57 |
| Example 1-2 | 3.00 | 5.00 | 1.99 |
| Example 1-3 | 3.00 | 4.74 | 1.99 |

TABLE 2

|  | Li | B |
| --- | --- | --- |
| Example 2-1 | 3.00 | 6.72 |
| Example 2-2 | 3.00 | 5.13 |
| Example 2-3 | 3.00 | 5.04 |

Cell Resistance Evaluation

Figure 3A:
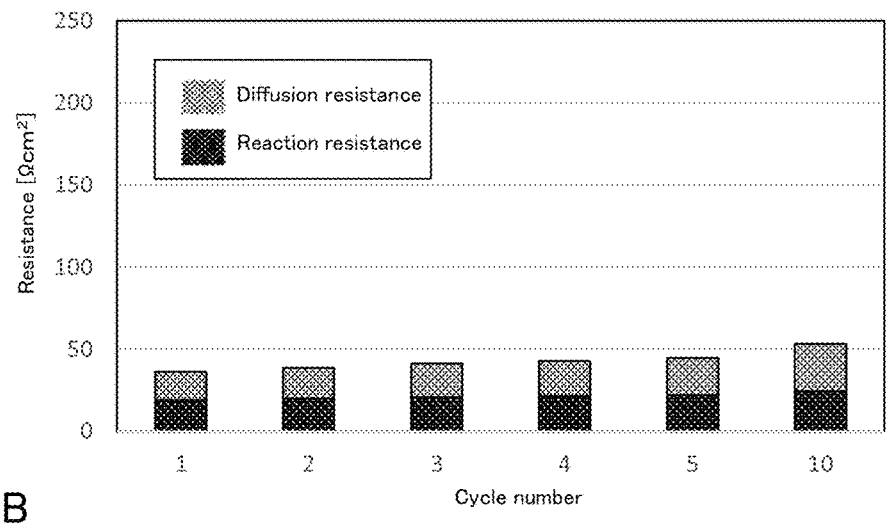
FIGS. 3A to 3C are the results of the cell resistance evaluation in Examples 1-1 to 1-3.
Figure 3B:
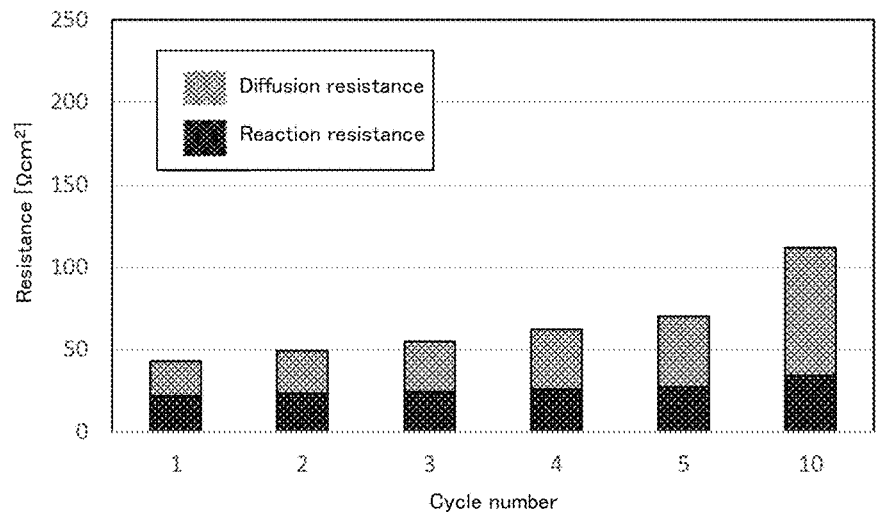
Figure 3C:
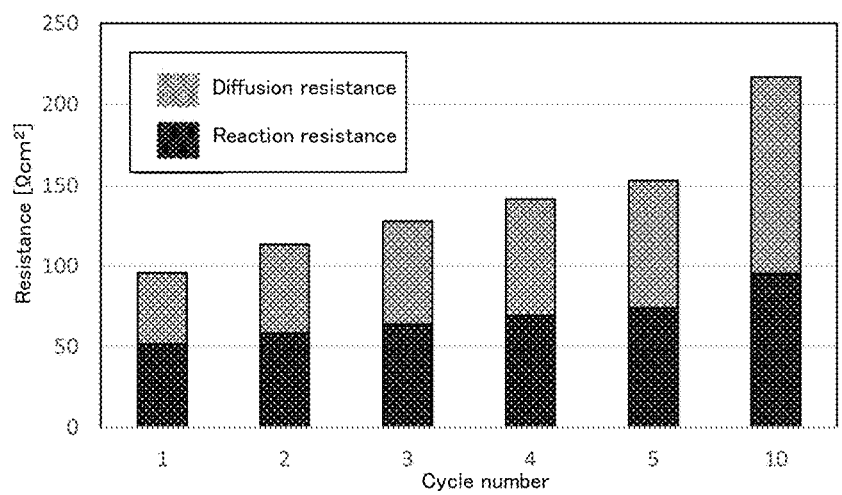
Figure 4A:
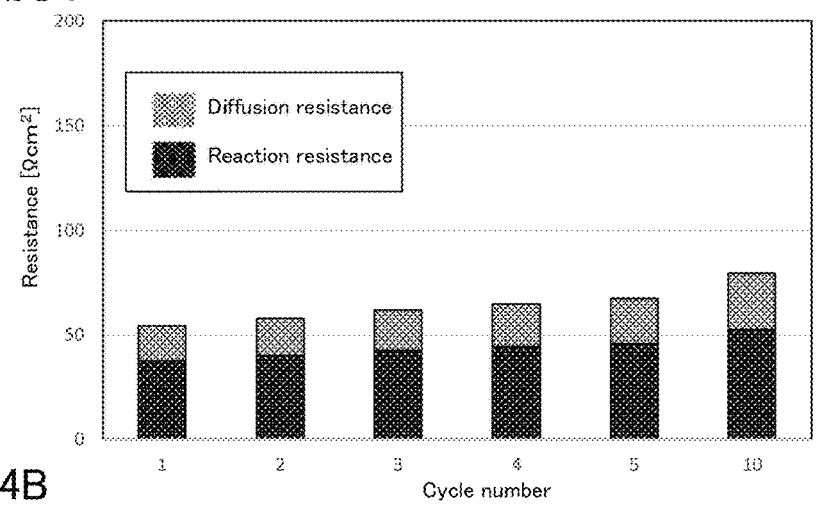
FIGS. 4A to 4C are the results of the cell resistance evaluation in Examples 2-1 to 2-3.
Figure 4B:
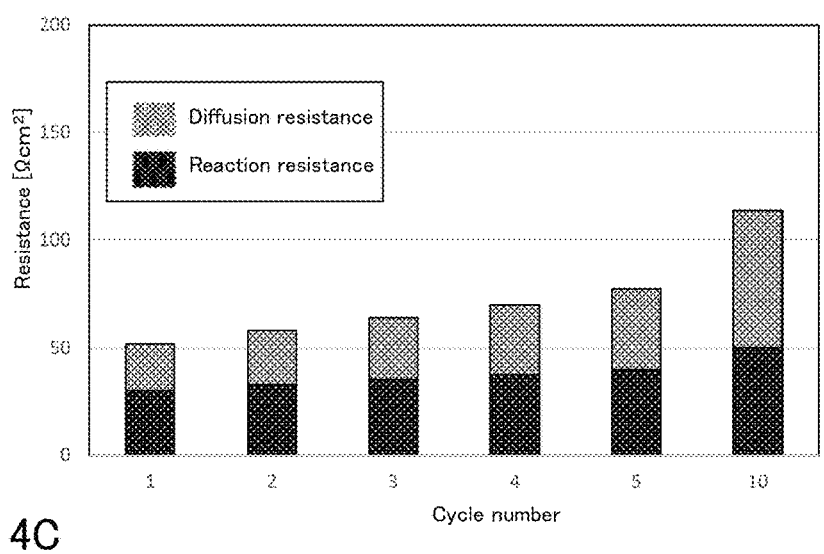
Figure 4C:
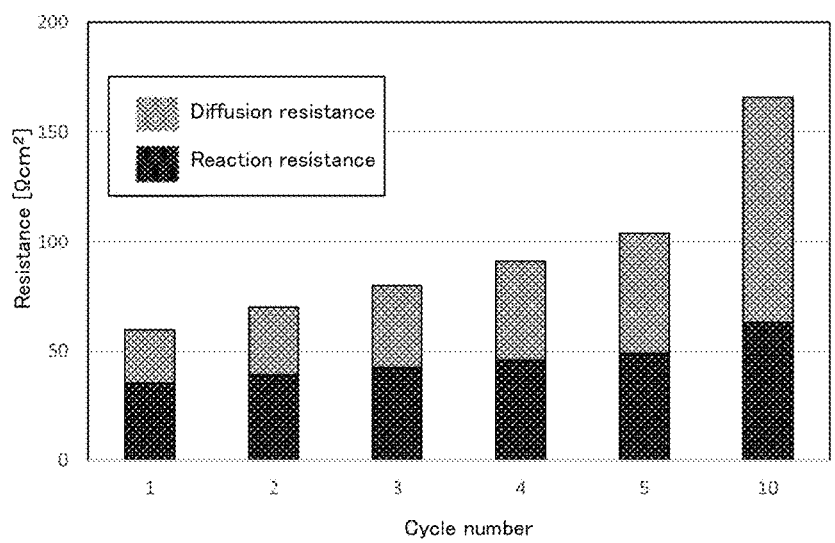
Figure 5A:
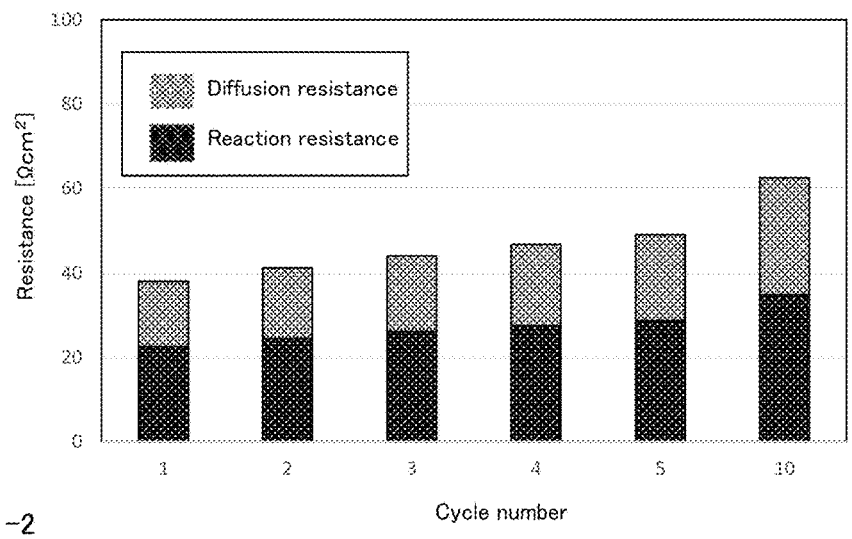
FIGS. 5A to 5C are the results of the cell resistance evaluation in Comparative Examples 1-1 to 1-3.
Figure 5B:
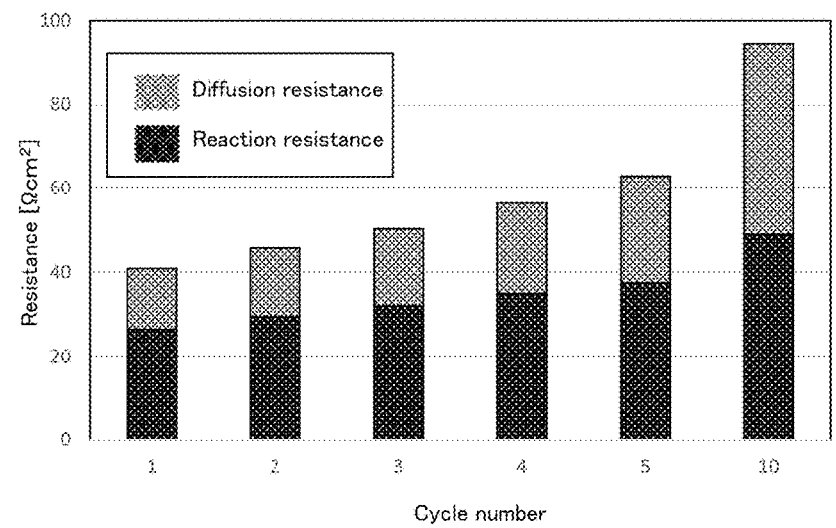
Figure 5C:
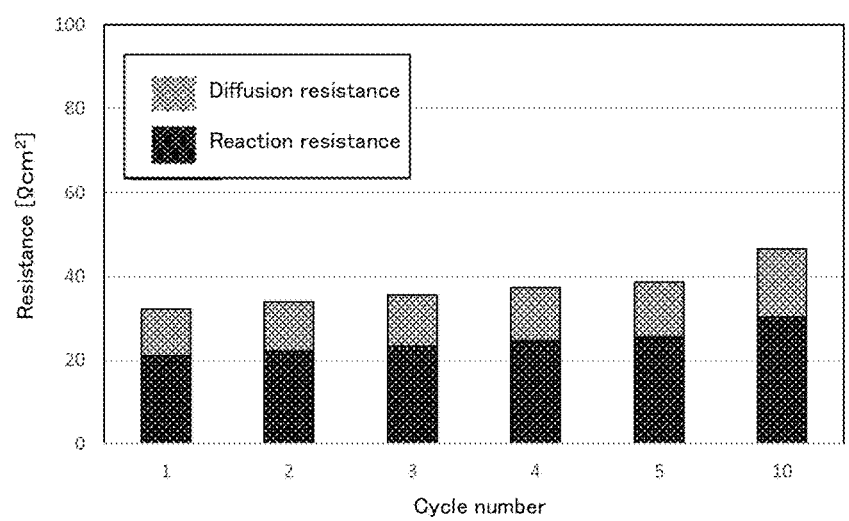

The cell resistance of the evaluation battery obtained above was measured. After a constant current-constant voltage charge in a range of 1.5 V to 3.0 V at 25° C. and 0.33 C, the evaluation battery was constant current-constant voltage discharged until SOC was 40%. Then, the resistance was calculated from the voltage decrease (ΔV) when the evaluation cell was discharged at rate of 3 C for five seconds. Incidentally, the resistance was determined as: a reaction resistance that is a resistance determined from the voltage decrease when discharged from 0 second to 0.1 second; and a diffusion resistance that is a resistance determined from the voltage decrease when discharged from 0.1 second to 5 second. Regarding a constant current charge and a constant current discharge at 0.33 C as 1 cycle, 1 to 10 cycles of charge/discharge was repeated, and the resistance of the all solid state battery after each cycle was measured. The results at SOC 40% are shown in FIGS. 3 to 5 and Table 3.

TABLE 3

| | Example 1-1 | | Example 1-2 | | Example 1-3 | |
|---|---|---|---|---|---|---|
| Cycle number | Reaction resistance | Diffusion resistance | Reaction resistance | Diffusion resistance | Reaction resistance | Diffusion resistance |
| 1 | 19.2 | 17.2 | 21.7 | 21.4 | 51.7 | 44.0 |
| 2 | 20.0 | 18.7 | 23.3 | 26.0 | 58.4 | 54.9 |
| 3 | 20.9 | 20.4 | 24.5 | 30.3 | 64.0 | 63.7 |
| 4 | 21.4 | 21.5 | 26.1 | 36.2 | 69.3 | 72.0 |
| 5 | 22.1 | 22.5 | 27.3 | 42.9 | 74.1 | 78.9 |
| 10 | 24.3 | 29.0 | 34.3 | 77.6 | 95.4 | 121.2 |

| | Example 2-1 | | Example 2-2 | | Example 2-3 | |
|---|---|---|---|---|---|---|
| Cycle number | Reaction resistance | Diffusion resistance | Reaction resistance | Diffusion resistance | Reaction resistance | Diffusion resistance |
| 1 | 37.5 | 16.8 | 30.2 | 21.7 | 35.5 | 24.3 |
| 2 | 40.0 | 17.9 | 33.0 | 25.1 | 39.3 | 30.7 |
| 3 | 42.5 | 19.3 | 35.4 | 28.6 | 42.5 | 37.5 |
| 4 | 44.4 | 20.4 | 37.6 | 32.5 | 45.9 | 45.2 |
| 5 | 45.8 | 21.6 | 39.9 | 37.5 | 48.9 | 55.0 |
| 10 | 52.7 | 26.8 | 50.1 | 63.6 | 63.1 | 102.6 |

| | Comp. Ex. 1-1 | | Comp. Ex. 1-2 | | Comp. Ex. 1-3 | |
|---|---|---|---|---|---|---|
| Cycle number | Reaction resistance | Diffusion resistance | Reaction resistance | Diffusion resistance | Reaction resistance | Diffusion resistance |
| 1 | 22.5 | 15.5 | 26.3 | 14.6 | 21.0 | 11.2 |
| 2 | 24.4 | 16.8 | 29.3 | 16.6 | 22.1 | 11.8 |
| 3 | 26.1 | 18.0 | 32.0 | 18.5 | 23.4 | 12.2 |
| 4 | 27.5 | 19.3 | 34.9 | 21.6 | 24.6 | 12.7 |
| 5 | 28.7 | 20.4 | 37.5 | 25.3 | 25.5 | 13.2 |
| 10 | 34.8 | 27.6 | 49.2 | 45.3 | 30.3 | 16.3 |

* The unit of the resistance is $\Omega cm^2$

As shown in FIGS. 3 to 5 and Table 3, it was confirmed that the internal resistance in Examples 1-1 to 1-3 and Examples 2-1 to 2-3 was equivalent to Comparative Examples 1-1 to 1-3. Incidentally, although the internal resistance was low in Comparative Example 1-3, the evaluation in the cycle property was not good, as will be described later. The reason therefor is presumed that because of the oxygen deficiency of the coating portion of the formed film, an electron conductivity was induced so that the oxidation decomposition of the solid electrolyte occurred at the interface of the cathode active material and the solid electrolyte. Also, compared to Examples 1-1 to 1-3, a following tendency was confirmed; the internal resistance at each cycle was increased as the heat treatment temperature was increased, as shown in FIG. 3. The reason therefor is presumed that the conductivity and the oxidation resistance of the coating portion were influenced by the deficiency of Li and P due to the heat treatment. Also, in each of Examples 1-1 to 1-3, a following tendency was confirmed; the internal resistance was increased as the cycle number was increased. Also, as shown in FIG. 4, the similar tendencies as in Examples 1-1 to 1-3 and were also confirmed in Examples 2-1 to 2-3.

Cycle Property Evaluation

Figure 7:
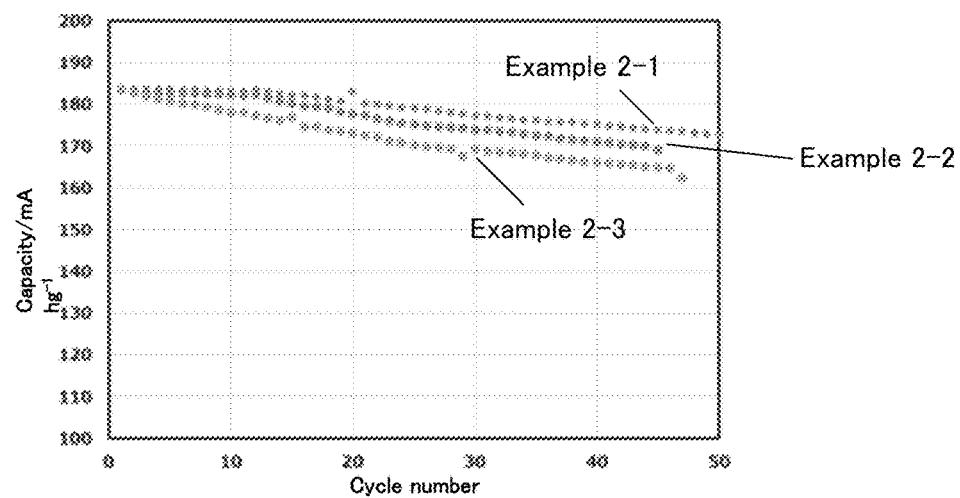
FIG. 7 is the results of the discharge capacity measurement after each cycle in Examples 2-1 to 2-3.
Figure 8:
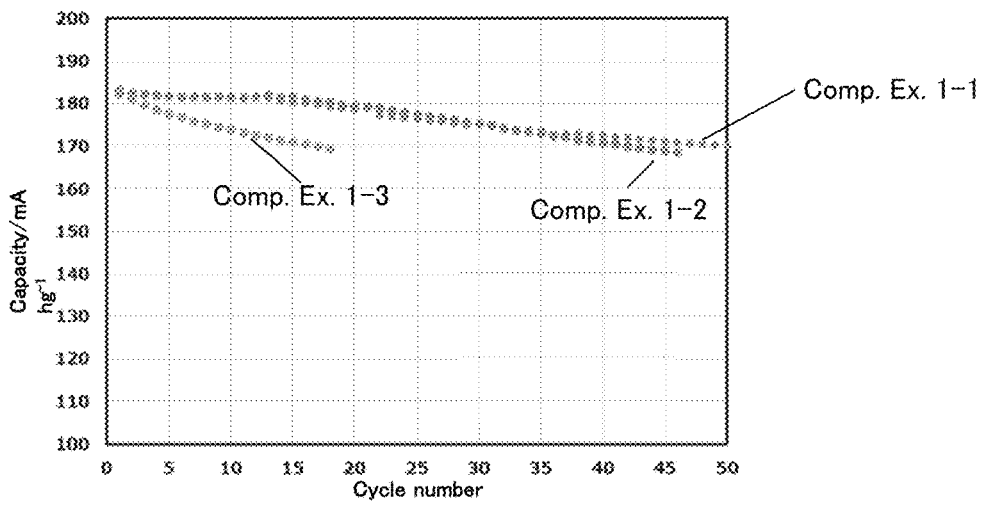
FIG. 8 is the results of the discharge capacity measurement after each cycle in Comparative Examples 1-1 to 1-3.

The evaluation battery obtained above was charged/discharged for 50 cycles of the charge/discharge cycles described above. The measurement results of the discharge capacity after each cycle are shown in FIGS. 6 to 8.

Figure 6:
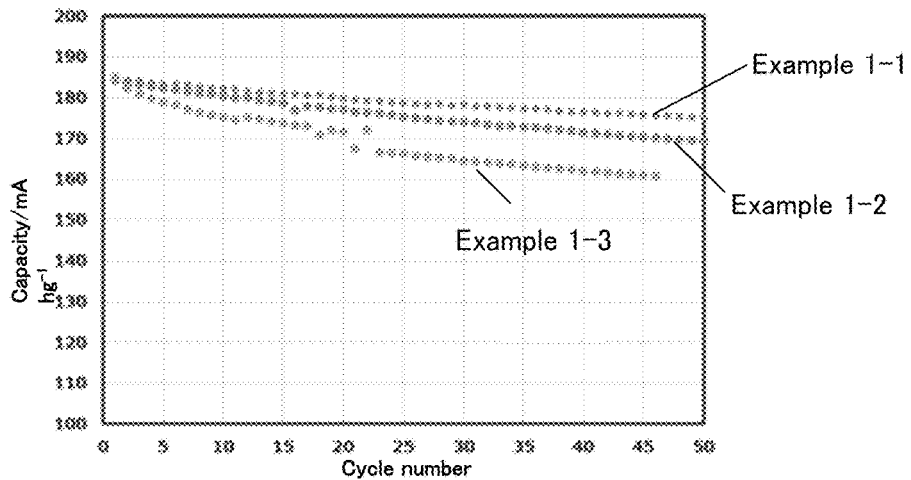
FIG. 6 is the results of the discharge capacity measurement after each cycle in Examples 1-1 to 1-3.

As shown in FIG. 6, good cycle property results were obtained in Example 1-1, Example 1-2, and Example 1-3, in this order. As shown in FIG. 3 described above, the internal resistance was low in in Example 1-1, Example 1-2, and Example 1-3, in this order. Therefore, it was suggested that lower the internal resistance, the better the cycle property. Also, as shown in FIG. 7, good cycle property results were obtained in Example 2-1, Example 2-2, and Example 2-3, in this order. As shown in FIG. 4 described above, the internal resistance was low in Example 2-1, Example 2-2, and Example 2-3, in this order. Therefore, it was suggested that lower the internal resistance, the better the cycle property. Meanwhile, as shown in FIG. 8, although good cycle property results were obtained in Comparative Example 1-1, Comparative Example 1-2, and Comparative Example 1-3, in this order, the cycle property was remarkably low in Comparative Example 1-3.

REFERENCE SIGNS LIST

1 . . . cathode active material
2 . . . coating portion
10 . . . coated cathode active material
11 . . . cathode active material layer
12 . . . anode active material layer
13 . . . solid electrolyte layer
14 . . . cathode current collector
15 . . . anode current collector
20 . . . all solid state battery

What is claimed is:

1. A method for producing a coated cathode active material,
the coated cathode active material including a cathode active material having a granular shape, and a coating portion coating at least a part of a surface of the cathode active material, the method comprising:
a preparing step of preparing the cathode active material, and a coating portion forming step of forming the coating portion including a scandium lithium phosphate based compound on the surface of the cathode active material by a barrel sputtering method using $Li_3Sc_2(PO_4)_3$, as a target, wherein a thickness of the coating portion is 5 nm or more and 20 nm or less, a coverage of the coating portion is 50% or more and 100% or less, and in the coating portion forming step, a heat treatment is not carried out after the barrel sputtering, and a molar ratio of Li, Sc, and P in the scandium lithium phosphate based compound satisfies Li:Sc:P=3.00: 2.19:2.57.

2. The method for producing a coated cathode active material according to claim 1, wherein the cathode active material is $LiNi_{1/3}Co_{1/3}Mn_{1/3}O_2$.

3. The method for producing a coated cathode active material according to claim 1, wherein the coverage of the coating portion is 70% or more and 100% or less.

4. The method for producing a coated cathode active material according to claim 1, wherein the coverage of the coating portion is 90% or more and 100% or less.

* * * * *

UNITED STATES PATENT AND TRADEMARK OFFICE
CERTIFICATE OF CORRECTION

| | | |
|---|---|---|
| PATENT NO. | : 11,990,619 B2 | Page 1 of 1 |
| APPLICATION NO. | : 17/538705 | |
| DATED | : May 21, 2024 | |
| INVENTOR(S) | : Aoyagi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 60 days.

Signed and Sealed this
First Day of April, 2025

Coke Morgan Stewart
*Acting Director of the United States Patent and Trademark Office*